United States Patent
Pawar et al.

(10) Patent No.: US 11,178,132 B2
(45) Date of Patent: *Nov. 16, 2021

(54) UNIFIED VPN AND IDENTITY BASED AUTHENTICATION TO CLOUD-BASED SERVICES

(71) Applicant: MOBILEIRON, INC., Mountain View, CA (US)

(72) Inventors: Vijay Pawar, Palo Alto, CA (US); Atul Vijay Tulshibagwale, Cupertino, CA (US); Kumara Das Karunakaran, Milpitas, CA (US); Jian Liu, Fremont, CA (US)

(73) Assignee: MOBILEIRON, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,800

(22) Filed: Dec. 19, 2019

(65) Prior Publication Data
US 2020/0128000 A1    Apr. 23, 2020

Related U.S. Application Data

(63) Continuation of application No. 15/595,648, filed on May 15, 2017, now Pat. No. 10,673,838.
(Continued)

(51) Int. Cl.
*H04L 29/06* (2006.01)
*G06F 21/36* (2013.01)
(Continued)

(52) U.S. Cl.
CPC ...... *H04L 63/0823* (2013.01); *H04L 63/0272* (2013.01); *H04L 63/083* (2013.01);
(Continued)

(58) Field of Classification Search
CPC .. H04L 63/0823; H04L 63/0861; H04L 67/10
See application file for complete search history.

(56) References Cited

U.S. PATENT DOCUMENTS 7,996,888 B2 ‡  8/2011  Asunmaa ............... G06F 21/31
                                                      726/9
8,621,216 B2 ‡ 12/2013  Husa .................... H04L 9/0861
                                                      713/169
(Continued)

FOREIGN PATENT DOCUMENTS

CN     103503407       1/2014
WO     2010115607 A1  10/2010
(Continued)

OTHER PUBLICATIONS

Author Unknown. Dev Overview of OpenID Connect. 2015.‡

*Primary Examiner* — Lynn D Feild
*Assistant Examiner* — Viral S Lakhia
(74) *Attorney, Agent, or Firm* — Van Pelt, Yi & James LLP (57) ABSTRACT

Techniques are disclosed to provide VPN and identity based authentication to cloud-based services. In various embodiments, a request to authenticate a user to a service is received. A user identity associated with one or both of the user and the request is determined based at least in part on data comprising the request. An identity assertion is generated based at least in part on the user identity. The identity assertion is provided to a requesting node with which the request to authenticate is associated.

16 Claims, 8 Drawing Sheets

Related U.S. Application Data (60) Provisional application No. 62/336,451, filed on May 13, 2016.

(51) Int. Cl.
  *H04W 12/77* (2021.01)
  *H04W 4/80* (2018.01)
  *H04L 29/08* (2006.01)

(52) U.S. Cl.
  CPC ...... *H04L 63/0861* (2013.01); *H04L 63/0876* (2013.01); *G06F 21/36* (2013.01); *H04L 63/0492* (2013.01); *H04L 63/0853* (2013.01); *H04L 63/0884* (2013.01); *H04L 63/18* (2013.01); *H04L 67/10* (2013.01); *H04W 4/80* (2018.02); *H04W 12/77* (2021.01)

(56) References Cited

U.S. PATENT DOCUMENTS

| | | | |
|---|---|---|---|
| 8,776,209 B1 ‡ | 7/2014 | Kumar | H04L 63/0272 380/270 |
| 8,855,312 B1 | 10/2014 | Hodgman | |
| 8,904,482 B1 | 12/2014 | Dotan | |
| 9,032,490 B1 | 5/2015 | Khitrenovich | |
| 9,053,304 B2 ‡ | 6/2015 | Ronda | G06F 21/34 |
| 9,098,850 B2 ‡ | 8/2015 | Weiner | H04W 12/06 |
| 9,137,131 B1 * | 9/2015 | Sarukkai | H04L 67/42 |
| 9,203,814 B2 ‡ | 12/2015 | Perez | H04L 63/08 |
| 9,225,700 B1 | 12/2015 | Dotan | |
| 9,535,675 B2 * | 1/2017 | Mohamad Abdul | H04L 67/12 |
| 9,571,457 B1 * | 2/2017 | Hoy | H04L 63/20 |
| 9,613,190 B2 * | 4/2017 | Ford | G06F 21/62 |
| 9,646,150 B2 * | 5/2017 | Toth | H04L 9/3231 |
| 9,692,748 B2 * | 6/2017 | Maheshwari | H04W 28/08 |
| 9,736,145 B1 ‡ | 8/2017 | Hayes | H04L 63/0823 |
| 9,749,310 B2 ‡ | 8/2017 | Li | G06F 21/41 |
| 9,819,593 B1 * | 11/2017 | Vetter | H04L 67/2861 |
| 9,923,897 B2 ‡ | 3/2018 | Houston | H04L 63/10 |
| 9,992,187 B2 ‡ | 6/2018 | Lu | H04L 67/02 |
| 9,998,434 B2 * | 6/2018 | Verzun | G06F 21/606 |
| 10,019,532 B2 * | 7/2018 | Dufour | G06Q 30/0253 |
| 10,116,644 B1 ‡ | 10/2018 | Agrawal | H04L 63/0815 |
| 10,122,761 B2 ‡ | 11/2018 | Newell | H04L 63/20 |
| 10,375,052 B2 ‡ | 8/2019 | Kesari | H04L 51/22 |
| 2003/0172090 A1 | 9/2003 | Asunmaa | |
| 2010/0211780 A1 | 8/2010 | Mukkara | |
| 2011/0213956 A1 ‡ | 9/2011 | Mukkara | H04L 63/20 713/152 |
| 2011/0214176 A1 ‡ | 9/2011 | Burch | G06F 9/455 726/15 |
| 2013/0219479 A1 * | 8/2013 | DeSoto | H04W 12/06 726/6 |
| 2014/0006347 A1 | 1/2014 | Qureshi | |
| 2014/0020073 A1 * | 1/2014 | Ronda | G06F 21/44 726/7 |
| 2014/0108599 A1 | 4/2014 | Borzycki | |
| 2014/0173692 A1 | 6/2014 | Srinivasan | |
| 2014/0181504 A1 ‡ | 6/2014 | Almahallawy | H04L 63/062 713/15 |
| 2014/0245389 A1 | 8/2014 | Oberheide | |
| 2015/0188949 A1 * | 7/2015 | Mahaffey | H04W 12/37 726/1 |
| 2015/0200924 A1 ‡ | 7/2015 | Parla | H04L 63/0884 726/7 |
| 2015/0350168 A1 | 12/2015 | Hayton | |
| 2015/0372994 A1 | 12/2015 | Stuntebeck | |
| 2016/0078451 A1 * | 3/2016 | Evans | G06Q 20/34 705/317 |
| 2016/0087957 A1 * | 3/2016 | Shah | H04L 63/08 726/1 |
| 2016/0094546 A1 ‡ | 3/2016 | Innes | H04L 63/0823 713/156 |
| 2016/0191567 A1 ‡ | 6/2016 | Chahal | H04W 12/00 726/1 |
| 2016/0285858 A1 ‡ | 9/2016 | Li | H04L 63/0815 |
| 2016/0292694 A1 * | 10/2016 | Goldschlag | H04L 63/0272 |
| 2016/0308851 A1 ‡ | 10/2016 | Tiwari | H04L 63/0823 |
| 2016/0314299 A1 ‡ | 10/2016 | Almer | G06F 21/6218 |
| 2016/0330177 A1 * | 11/2016 | Singleton, IV | G06F 21/554 |
| 2017/0048252 A1 * | 2/2017 | Straub | H04L 67/06 |
| 2017/0054721 A1 ‡ | 2/2017 | Meriac | H04L 63/10 |
| 2017/0180351 A1 ‡ | 6/2017 | Lu | H04L 63/061 |
| 2017/0208038 A1 * | 7/2017 | Hinaman | H04L 63/083 |
| 2017/0277525 A1 ‡ | 9/2017 | Czarnecki | G06F 8/61 |
| 2017/0279803 A1 | 9/2017 | Desai | |
| 2017/0303368 A1 | 10/2017 | Trevathan | |
| 2018/0068107 A1 | 3/2018 | Takemori | |
| 2018/0115547 A1 ‡ | 4/2018 | Peterson | H04L 63/08 |
| 2018/0295134 A1 ‡ | 10/2018 | Gupta | H04L 63/10 |
| 2019/0149514 A1 * | 5/2019 | Jawahar | H04L 9/3268 726/7 |

FOREIGN PATENT DOCUMENTS

| | | | |
|---|---|---|---|
| WO | WO 2010115607 | ‡ | 10/2010 |
| WO | 2015154066 A1 | | 10/2015 |
| WO | WO 2015154066 | ‡ | 10/2015 |

\* cited by examiner
‡ imported from a related application

ID SERVICES

UNIFIED VPN AND IDENTITY BASED AUTHENTICATION TO CLOUD-BASED SERVICES

CROSS REFERENCE TO OTHER APPLICATIONS

This application is a continuation of U.S. patent application Ser. No. 15/595,648, now U.S. Pat. No. 10,673,838, entitled UNIFIED VPN AND IDENTITY BASED AUTHENTICATION TO CLOUD-BASED SERVICES filed May 15, 2017, which claims priority to U.S. Provisional Patent Application No. 62/336,451, entitled UNIFIED VPN AND IDENTITY BASED AUTHENTICATION TO CLOUD-BASED SERVICES filed May 13, 2016, both of which are incorporated herein by reference for all purposes.

BACKGROUND OF THE INVENTION

Virtual Private Networks (VPNs) are a common means of establishing trust and user identity within corporate networks. The application of VPNs to mobile devices has made it possible for enterprises to get the same level of trust from mobile devices. However, many enterprise productivity applications reside outside conventional enterprise network boundaries, in cloud-based services. There is therefore a need to be able to access these services securely too, without having to establish their user identity individually with each service (most commonly by entering passwords to login to each such service).

VPNs typically establish user identity through the use of a pre-established secure credential on the user's device that is unlocked by the user entering a password or PIN, or more recently through biometrics, such as using the device to read a fingerprint. Such credentials are commonly in the form of PKI keys and certificates provisioned on the devices with the help of an Enterprise Mobility Management (EMM) solution.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Leveraging VPN security (such as that offered by MobileIron® Tunnel) to establish trust and/or user identity for purposes of user authentication to distributed cloud-based services, even with respect to request to access such a service from a non-VPN device, is disclosed. In various embodiments, cloud-based services may use various security protocols, such as federated identity standard protocols, e.g. SAML or OAuth. In some embodiments, a mechanism is provided to provide VPN-based authentication to authenticate users in the event a direct VPN connection is not available, e.g., with respect to a device from which access is requested. In some embodiments, the public-key infrastructure (PKI) and the Enterprise Mobility Management (EMM) service that together form the basis of the VPN security may be modified and leveraged to establish authentication to cloud-based services. In some embodiments, certificates associated with VPN may be modified, and/or enterprise directory information may be leveraged in conjunction with such certificates, in order to establish the user's identity with cloud-services.

Most of the cloud-services of interest to enterprise customers support the federated identity standard SAML. Many services also support another federated identity standard—OAuth. When using SAML, cloud-services typically determine the identity provider (i.e. the entity asserting the identity of the user) based on the user's claimed unique identifier, which is usually the email address or other attributes obtained from the session like a stored cookie. In various embodiments, an identity provider may use VPN-based authentication to authenticate a user regardless of whether a device via which a request to access a cloud-based service is made is connected via a VPN.

Figure 1:
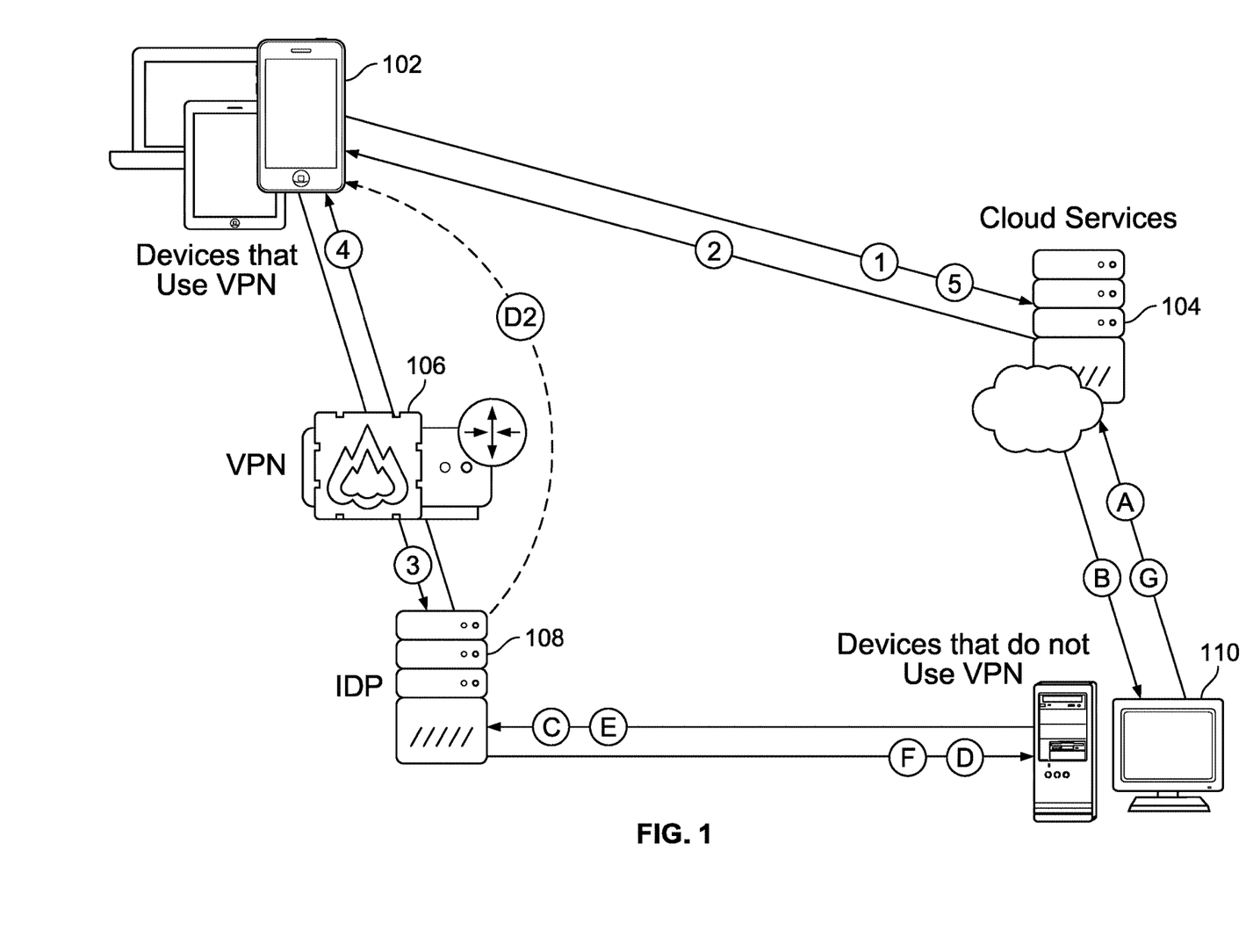
FIG. 1 is a block diagram illustrating an embodiment of a system and process to perform VPN-based authentication to a cloud service.

FIG. 1 is a block diagram illustrating an embodiment of a system and process to perform VPN-based authentication to a cloud service. In the example shown, device(s) 102 may be used to securely access services, such as enterprise applications, via VPN 106. For example, VPN 106 may comprise a secure tunnel or other certificate-based connection to a security proxy, such as a Mobilelron® Sentry®. A certificate may be provisioned on the device 102, e.g., at device registration. For example, an Enterprise Mobility Management (EMM) server may provision the certificate on the device 102. The EMM server may maintain device security posture information, e.g., jail broken or not, unauthorized app installed, etc., and may provide such posture information to the security proxy. One or more agents (secure, EMM-managed apps) on the device 102 may act as agents to provide information relevant to security posture of the device 102, to take action on device 102 in response to a detected security breach, and/or to establish and maintain the secure VPN connection 106.

In various embodiments, device(s) 102 connected via VPN 106 may be used to access cloud services 104. The connection to the cloud services 104 may or may not be through the VPN 106. Cloud services 104 may be configured to redirect access requests to an identify provider 108. Device 102 once redirected may communicate with identity provider (IDP) 108 via VPN 106 to obtain an assertion or other credential to present to the cloud service 104. In various embodiments, a certificate or other credential associated with the device 102's connection via VPN 106 may be used by the identity provider (IDP) 108 to establish the user identity associated with request, and to construct an assertion to authenticate the user to the cloud service 104. In some embodiments, a security posture check may be performed, and the redirected authentication request may be denied or not forward based at least in part on security posture information indicate the device 102 is not in a secure posture. The user identity certificate used to secure the VPN (Tunnel) has various attributes that describe the user, such as the user's email address, or employee id. In addition, information may be obtained from systems like EMM or other services (like Active Directory or Cloud Service), or constant value common to a group of users such as company affiliation, usage license, role etc. The IdP provides a flexible way in which customers can specify rules to transform such user identifying information into information that specific cloud service providers expect in federated identity messages in order to uniquely identify the user of that cloud service. Such transformations may include selecting one or more fields, encoding and decoding them in various formats In the example shown in FIG. 1, an access request via a VPN-connected device 102 may be processed according to the following sequence, with each number paragraph corresponding to a numbered arrow in FIG. 1:

1. A user using a VPN connected device 102 requests access to a cloud service 104. In various embodiments, the request may or may not be sent through the VPN 106.
2. The cloud service 104 requests the user to authenticate with an identity provider 108. This is typically using a federated identity standard such as SAML.
3. The user's application (at device 102) redirects the request to the identity provider 108 via VPN 106.
4. Based on the identity of the user within the user identity certificate used to establish the VPN connection with VPN 106, the identity provider 108 generates an identity assertion describing the user to the cloud-service 104. In some embodiments, VPN 106 and identity provider 108 may be integrated into the same physical system. In some embodiments, the VPN 106 is configured to securely pass user session context data (e.g., email address, IP address, identity certificate, application ID, to the identity provider 108. For example, when forwarding an access request from the device 102 to the identity provider 108, in some embodiments the VPN 106 may include functionality to inject signed HTTP headers that include or otherwise indicate the context information. The assertion generated by identify provider 108 is sent back to the user's application (at device 102) to deliver to the cloud-service 104.
5. The user's application redirects the user with this assertion to the cloud-service 104, which establishes the user's identity within the service 104 based on the assertion presented by the application (which was generated by the identity provider 108).

Referring further to FIG. 1, in various embodiments VPN-based user identity may be used to authenticate a user to a cloud service, even if the request originates from a device not connected to the VPN. In the example shown, device(s) 110 not connected to the VPN 106, e.g., legacy Windows® operating system based personal computers, unmanaged mobile or other unmanaged devices, etc., may be used to request access to a cloud service 104. In various embodiments, the cloud service 104 may redirect the requesting application to identity provider 108 associated with VPN 106. In various embodiments, identity provider 108 may use one or more techniques potentially involving VPN 106 to authenticate the user to the cloud service 104.

For example, in some embodiments, another device associated with the requesting user and also included among devices 102 associated with VPN 106 may be used to authenticate the user. For example, in some embodiments, a push notification may be sent by the identity provider 108 to a VPN-connected device 102 associated with the same user. An email address or other user identity associated with the request via a non-VPN device 110 may be mapped to a device 102 on the VPN. Alternatively, the identity provider 108 may prompt the user for such identifying information that is used to uniquely identify the device 102 for that user. Upon identifying the device 102 for the user, the identity provider 108 may send a push notification to that device. When the user connects via their device 102, a verified identity of the user established via and/or in connection with the VPN 106 may be used to generate an assertion to authenticate the user to the cloud service 104 to enable access to the cloud service 104 via the non-VPN device 110.

In the example shown in FIG. 1, an access request via a non-VPN-connected device 110 may be processed according to the following sequence, with each lettered paragraph corresponding to a correspondingly labeled arrow in FIG. 1:

A. The user requests access to the cloud-service 104 from a device 110 that is not connected to the VPN 106.
B. The cloud-service 104 requests the user to be authenticated by the identity provider 108.
C. The user's application (on the device 110) redirects this request to the identity provider 108.
D. The identity provider 108 takes an action as disclosed herein, which may require user interaction, to establish the user's identity. The authentication request represented by arrow "D", although shown as going to the non-VPN device 110 associated with the request, in various embodiments may be directed to a different device assigned to the same user, such as a VPN-connected device 102, e.g., via a push notification "D2". For example, the user may be prompted to indicate approval and/or enter authentication information and/or other identity or presence information via the VPN-connected device 102. Furthermore, additional approvals may be obtained from one or more other users in a single approval, or a quorum or chain based approval, by sending similar push messages to devices of approvers for that user/transaction.

E. The user establishes their identity with the identity provider 108 and any additional approvals are received. The arrow "E", although shown originating from the non-VPN device 110, may be from a different device assigned to the same user, such as in input from device 102 arriving at identity provider 108 through VPN 106.

F. Based on the user's identity, which in some embodiments may be inferred via the VPN and/or established via credentials provided at the device 110, the identity provider 108 generates an identity assertion describing the user to the cloud-service 104. This assertion is sent back to the user's application (at the originating device 110) to deliver to the cloud-service 104.

G. The user's application (at the originating device 110) redirects the user with this assertion to the cloud-service 104, which establishes the user's identity within the service 104, based on the assertion presented by the application (which was generated by the identity provider 108).

In various embodiments, one or more techniques may be used to authenticate a user in connection with a request from a non-VPN connected device (e.g., devices 110 of FIG. 1) to access a cloud-based service (e.g., cloud services 104 in FIG. 1). Examples of such techniques include, without limitation, one or more of the following:

1. Inline authentication using certificates;
2. Inline authentication using techniques other than certificates;
3. Enterprise identity provider authentication; and
4. Push notification based authentication.

Inline Authentication Using Certificates.

In enterprise environments, PKI certificates and keys may be deployed to devices that may not always be VPN connected. In some embodiments, when a user from a device that is not connected to the VPN but which has been provisioned with an employee PKI key and certificate presents an authentication request to the VPN associated identity provider, the identity provider challenges the user to present proof-of possession of the key corresponding to their employee certificate. This may be done using standard protocols such as TLS with client-authentication. If the user is able to present this proof, then the user is considered to be authenticated, and the identity provider generates an identity assertion to the cloud-based service provider based on this information.

Inline Authentication Using Techniques Other than Certificates.

In some embodiments, the VPN associated identity provider may challenge the user to enter a password that can be verified against an enterprise data source (such as the enterprise employee directory, e.g., Active Directory®) to establish the identity of the user. Some enterprises may configure this to be multi-factor authentication, but in such cases, the identity provider in various embodiments will be able to verify the information presented by the user directly against a source of authentic information from the enterprise.

Enterprise Identity Provider Authentication.

In some embodiments, the VPN associated identity provider may act as a federation proxy. When it receives an authentication request from a cloud-service provider, it generates a new authentication request to the enterprise identity provider and redirects the user to it. The enterprise identity provider may employ any secure technique to establish the user's identity, and generates an identity assertion that it presents to the federated identity provider by redirecting the user's app. The federated identity provider then generates a new assertion based on the information obtained from the identity assertion generated by the enterprise identity provider.

Push Notification Based Authentication.

In some embodiments, push notification based authentication, e.g., as described above, may require a client app to be installed on the user's mobile device or other VPN connected device. In some embodiments, the required client app may be obtained by mobile devices through their employer's EMM server and/or enterprise app store. Alternatively, the functionality may be bundled with other device management client apps such as a mobile device management (MDM) agent or app.

In various embodiments, one or more of the above described authentication techniques may be combined with a workflow to require an approval from a third party (e.g., supervisor or other authority), e.g., as described in connection with FIG. 8.

Figure 2:
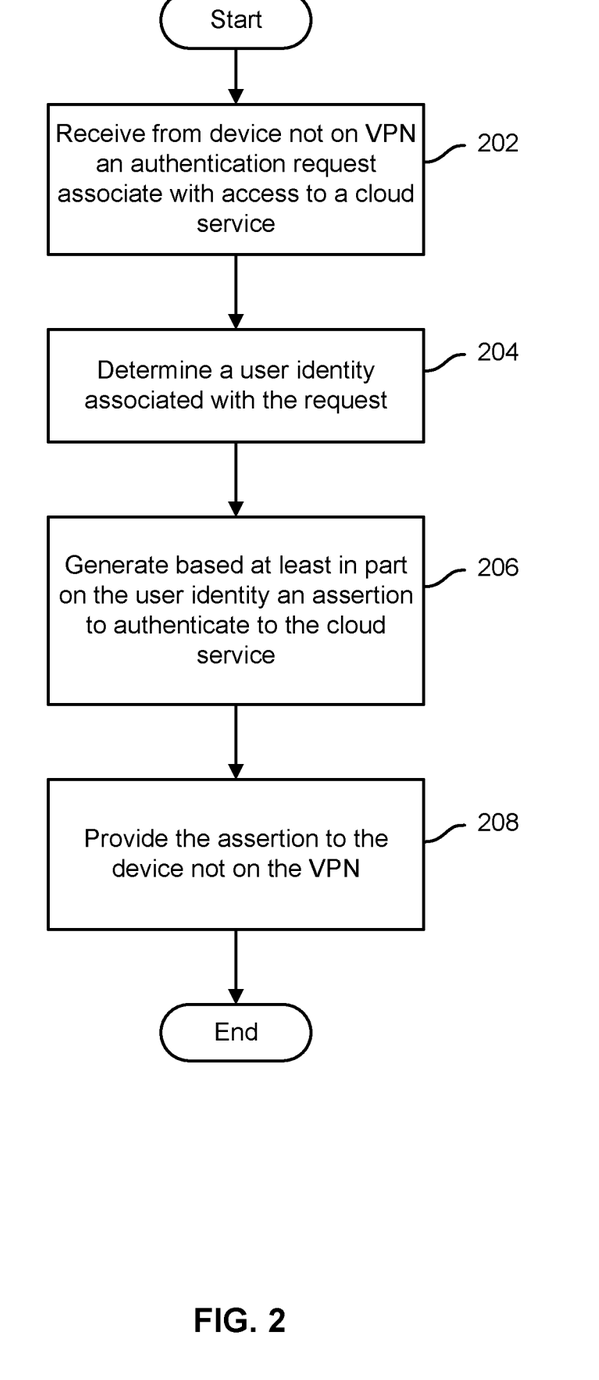
FIG. 2 is a flow chart illustrating an embodiment of a process to provide VPN-based authentication to a cloud service.

FIG. 2 is a flow chart illustrating an embodiment of a process to provide VPN-based authentication to a cloud service. In various embodiments, the process of FIG. 2 may be performed by an identity provider, such as identity provider 108 of FIG. 1. In the example shown, an authentication request associated with a request to access a cloud service is received from a device (mobile device, computer, etc.) not connected via a VPN (202). A user identity associated with the authentication request is determined (204). For example, one or more of the above-described techniques (inline authentication using certificates, inline authentication by other techniques, enterprise IDP authentication, and push notification based authentication, e.g., via a VPN connected device) may be used to determine/establish the user identity. In some embodiments, an email address or other identifier comprising or otherwise associated with the authentication request may be mapped to a user and/or a user device other than the one from which the authentication request was received. The other device may be VPN connected, and the user identity may be determined and/or verified via the VPN connected device, e.g., via a certificate or other credential used to establish a VPN tunnel and/or connection. In some embodiments, approval from a third party may optionally be required and obtained, e.g., as shown in FIG. 8. An assertion (e.g., a SAML or other assertion) to be used to authenticate to the cloud service is generated based at least in part on the determined user identity (206). The assertion is returned to the device from which the authentication request was received (208).

Figure 3:
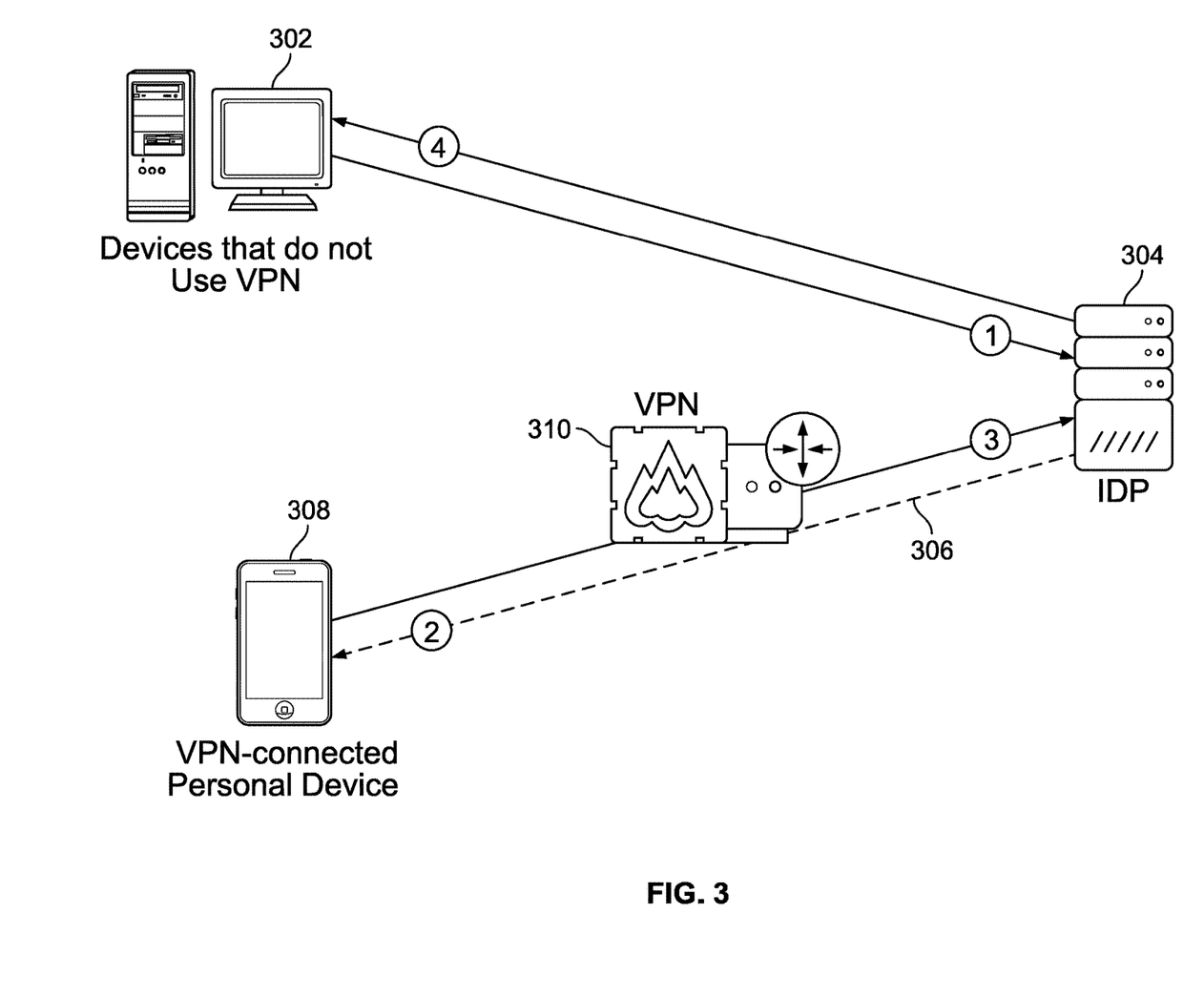
FIG. 3 is a block diagram illustrating an embodiment of a system and process to use a push notification to perform VPN-based authentication to a cloud service.

FIG. 3 is a block diagram illustrating an embodiment of a system and process to use a push notification to perform VPN-based authentication to a cloud service. In the example shown, a non-VPN device 302 that is being used to access a cloud based service is redirected to an identity provider 304 (arrow "1"), which sends a push notification (arrow "2") via a notification network and/or service 306 (e.g., Apple Push Notification Service, or equivalent) to a VPN-connected device 308 associated with the same user as the authentication request. A user identity associated with the device 308 is verified via VPN 310. For example, a certificate installed on device 308 and used to establish a secure tunnel or other secure connection via VPN 310 may be used to establish the user identity. The IDP 304 generates based at least in part on the user identity an assertion to be used to authenticate to the cloud service. The assertion is returned to the device 302 from which the authentication request was received. Optionally, there may be additional such push notifications to zero or more other VPN connected devices to obtain approvals for the user or transaction to proceed.

In various embodiments, authentication may be performed as follows, with the numbered paragraphs below corresponding to the similarly numbered arrows in FIG. 3:

1. The user's app presents an authentication request from a cloud-based service provider to the identity provider. In some embodiments, this corresponds to the step "C" in FIG. 1.
2. The identity provider determines that the user request is coming from a device not connected through the VPN, and determines that it needs to take one or more of the following additional steps to perform user authentication:
   a. Based on its configuration, it determines that the user needs to be authenticated using the "Push Notification" option.
   b. The identity provider may or may not be able to find out from the request who the user is claiming to be. This could be as a result of a persistent cookie set sometime earlier in the user's browser.
      i. If the identity provider cannot determine who the user claims to be, it prompts the user to enter just their username or email address in an additional interaction not shown in FIG. 3.
      ii. Otherwise the identity provider will act on the user's claim obtained from the request.
   c. Once the identity provider determines who the user claims to be, it will look up any VPN registered device that has been assigned to that user. This may be the user's business mobile phone, for example.
   d. The identity provider then generates a push notification to that device. This can be done through an agent installed on the device, or by other mechanisms such as sending a text message to the device. The push notification in some embodiments will result in an agent (e.g., client app) informing the user clearly about the context of the authentication (i.e. which service provider the user authentication is required for). In some embodiments, approval from a third party approver may be required and obtained, e.g., as described in connection with FIG. 8.
3. Authenticating the user in response to the push notification may require informing and assuring the context and purpose of the authentication, e.g., as described below in connection with FIG. 4. In some embodiments, the user may approve the action through an agent on the VPN-associated device, e.g., by authenticating himself/herself to the VPN based on existing VPN policy. As a result of this authentication, the identity provider obtains authoritative identity information about the user from the VPN.
4. The identity provider then generates an identity assertion based on this user identity information and sends it to the originating device to be redirected to the cloud-based service provider. In some embodiments, this corresponds to step "F" in FIG. 1.

Figure 4:
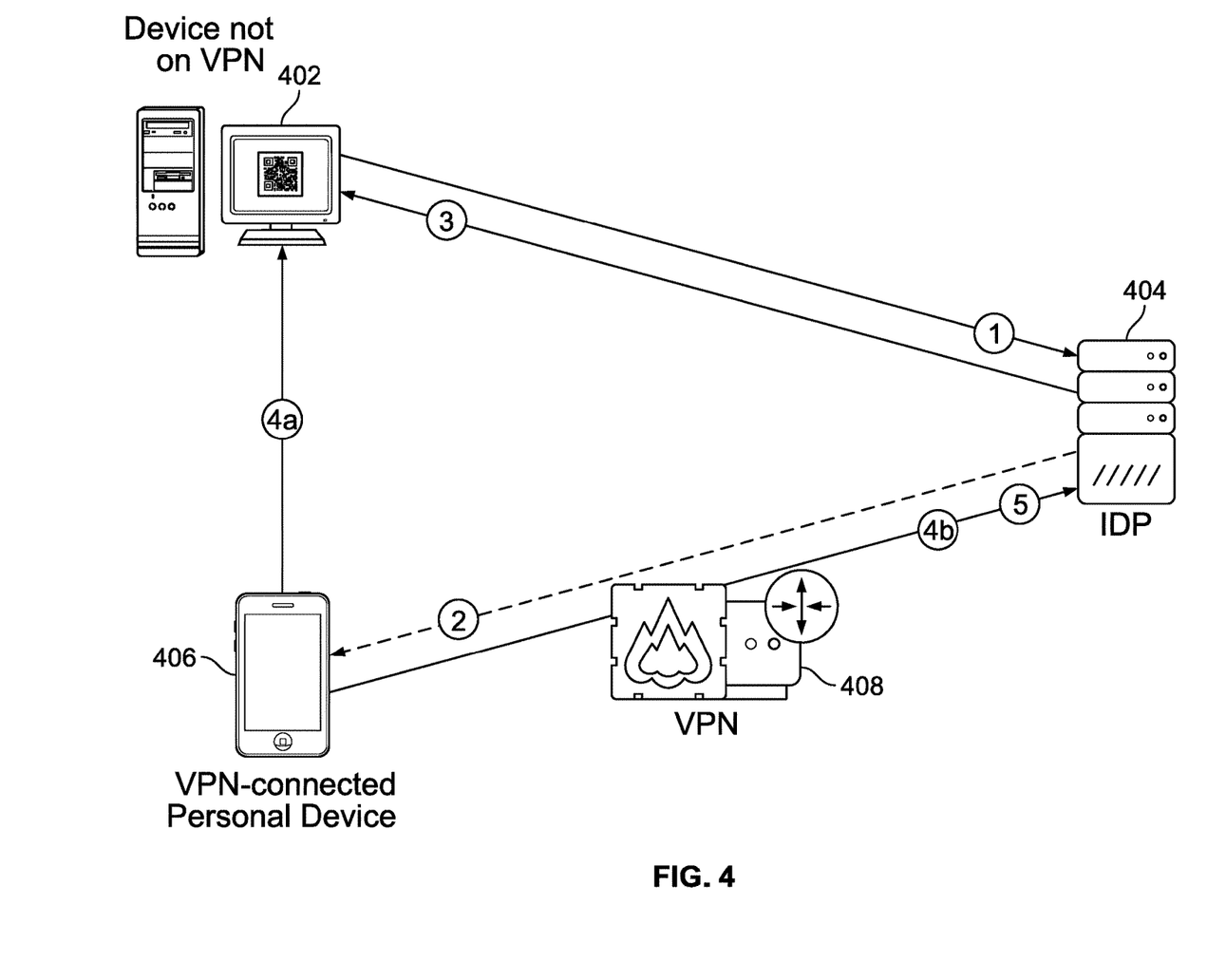
FIG. 4 is a block diagram illustrating an embodiment of a system and process to provide context assurance in connection with performing VPN-based authentication to a cloud service.

FIG. 4 is a block diagram illustrating an embodiment of a system and process to provide context assurance in connection with performing VPN-based authentication to a cloud service. In the example shown, a device 402 not on a VPN is used to attempt to access a cloud service (not shown), which redirects the device 402 to an identity provider 404. Identity provider 404 sends a push notification (dashed arrow "2") to a VPN-connected device 406. Identity provider 404 further prompts the non-VPN device 402 to display or otherwise provide a visual, audible, electromagnetic, or other challenge. In the example shown, the device 402 displays a QRC code and gives instructions to the user on how to authenticate themselves. The VPN-connected device 406 (e.g., via an app or agent installed thereon) may be used to scan (or otherwise verify presence of) the challenge. Resulting data is provided to the identity provider 404 via the VPN 408, which may in addition be used to establish the user identity, as described herein.

In various embodiments, the processing shown in FIG. 4 may include (numbered paragraphs corresponding to numbered arrows in FIG. 4):

1. The user presents an Authentication Request from a cloud-based service provider. In some embodiments, this corresponds to step "C" in the non-VPN-connected device case in FIG. 1.
2. The identity provider determines that the user context needs to be assured, and sends a push notification to an agent on the user's VPN registered device.
3. The identity provider also presents in the requesting app (e.g. browser), a static or dynamic visual challenge to the device requesting the authentication
4. The agent on the VPN-connected device instructs the user to capture the static image or dynamic visual pattern being displayed on the requesting device through the camera of the VPN registered device. The agent obtains this information from the device camera and sends it to the identity provider. The identity provider correlates in real-time the image/dynamic pattern with that sent to the requesting device. This assures the identity provider that the user is in close proximity of the device requesting authentication.
5. The user then uses the agent on the VPN-connected device to approve the action by authenticating himself/herself to the VPN based on existing VPN policy, and the identity provider obtains the authenticated certificate information from the VPN connection.

While a visual challenge is described in the above example, in various embodiments other techniques may be used to verify the mobile device is in close proximity to the user. For example, where available, Bluetooth or other near field communication may be used by the mobile device. For example, the mobile app may receive a prompt, via a push notification, to verify it is paired with and currently connected via Bluetooth to a laptop or other computer that is being used to access the service. In some embodiments, a biometric device, e.g., a fingerprint scanner, or a phone, laptop, or other portable computer may be used to verify the identity and/or presence of a user who is attempting to access a service via a device that does not itself have such capability.

In various embodiments, the identity provider may be configured to follow a set of cascading policies that determine which non-VPN authentication option to use in response to a authentication request not coming from a VPN connection. Such a cascading set of policies may include a decision sequence. One example of such a decision sequence is as follows and described below in connection with FIG. 5:
1. If the user has an assigned device registered with the VPN, use the push notification option.
2. If not, then challenge the user for client-certificate inline authentication. The browser can transparently or with user interaction, detect if the user does not have such certificates.
3. If the user does not have any certificates on the device or if the user is unable to prove their possession of the corresponding key, then generate a new authentication request and redirect the user to the enterprise identity provider to authenticate the user.

Figure 5:
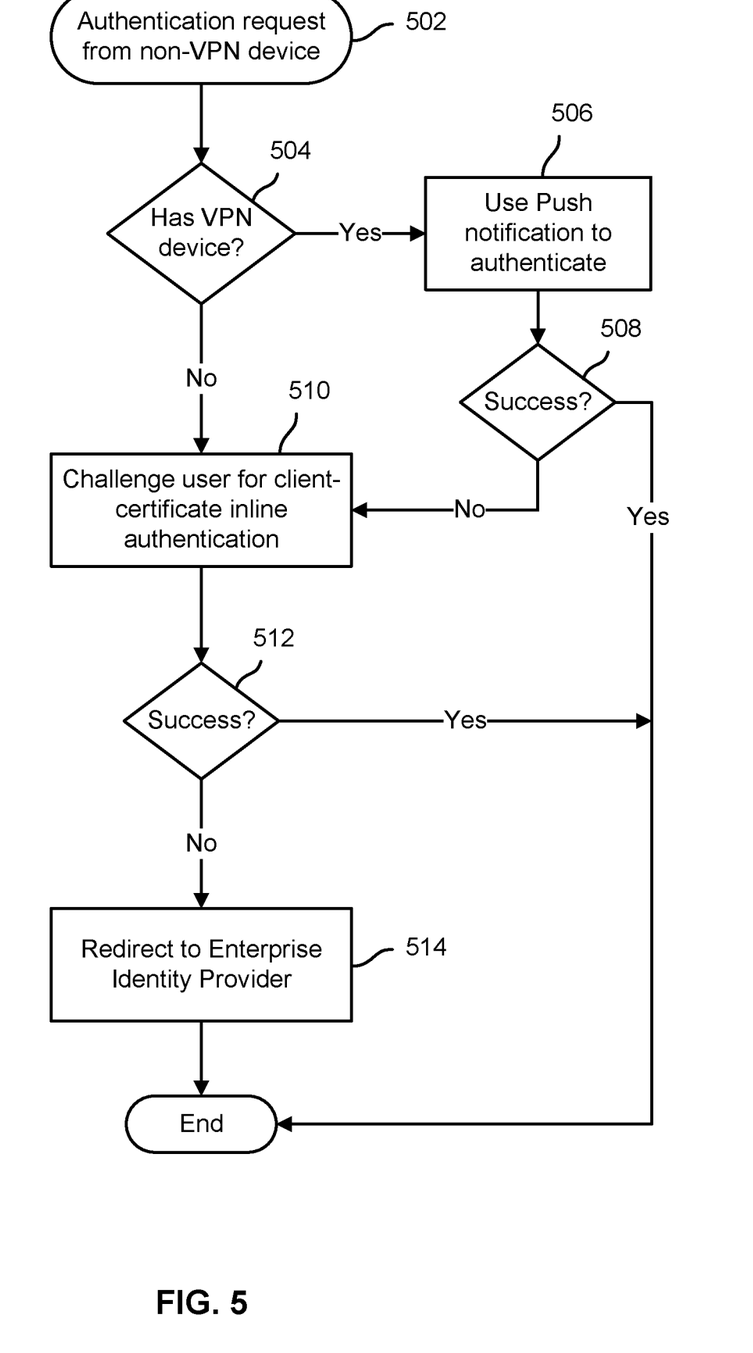
FIG. 5 is a flow chart illustrating an embodiment of a process to provide authentication to a cloud service.

FIG. 5 is a flow chart illustrating an embodiment of a process to provide authentication to a cloud service. In various embodiments, the process of FIG. 5 may be implemented by an identity provider, such as identity provider 108 of FIG. 1. In the example shown, an authentication request associated with a request to access a cloud service is received from a non-VPN device (502). If a user with which the request is associated is determined to have a VPN-associated device (504), such as a managed mobile device, a push notification is sent to the VPN-associated device to authenticate the user (506). If the push notification-based authentication succeeds, the process of FIG. 5 ends. If the push notification-based authentication fails (508) or if the user has no VPN-associated device (5040, the user is challenged to provide a client-certificate based inline authentication (510). If the client-certificate based inline authentication succeeds (512), the process ends. If instead the client-certificate based inline authentication does not succeed (512), the request is redirected to the enterprise identity provider (514) for traditional authentication.

Various cloud-based service providers may require different pieces of user-identity information in identity assertions that they expect from third-party identity providers. For example, Microsoft's Office365 cloud-based service requires SAML assertions used to login users to include the user's "Immutable ID" and "email address" information. In various embodiments, user information may be obtained by one or more of the following techniques:
1. Examine the authenticated user certificate for required information, and use it if it is sufficient for the cloud-based service provider the user is trying to reach.
2. Look up an authoritative enterprise user data source (such as Active Directory or EMM) for additional information required about the user, given the uniquely identifying user information from the authenticated user certificate.
3. Add a constant value common to some grouping of users, such as a company identifier common to all employees of a company.

In current VPNs, certificates may not include all information required by cloud-based service providers to authenticate the user. The PKI that creates the certificates is generally connected with an authoritative user information source (such as the Active Directory within an enterprise). So the certificate profile should be changed such that information required by all service providers of interest is encoded within the certificate. In various embodiments, X509 certificates may be used to encode information in one or both of the "Subject DN" and the "Subject Alternative Name" of the certificate.

In case some user attributes required by a service provider are not available within the certificate, in some embodiments the certificate contains uniquely identifying information about the user that can be used to look up the additional information about the user. The remainder of the authoritative information about the user required by the service provider may be obtained from one or more of an EMM attribute service (e.g., as described below) and an enterprise directory, such as Active Directory.

Depending upon how the user has been authenticated, information in the user's certificate may be different. For example, when a user is connected through a VPN, the information in the certificate may be different from when a user is authenticated using certificates, but from a non-VPN device. In various embodiments, an identity provider as disclosed herein provides a way to choose the right information from the authenticated certificate and map it to the identity information expected by the service provider. The identity provider enables administrators to create user information profiles that each may be applied to one or more cloud-based service providers. A user information profile specifies a set of cascading rules to obtain and map user information such as:

Get the "RFC822 Name" entry in the authenticated user certificate's "Subject Alternative Name" field, and map it to the "IDPEmail" attribute in the Attribute Statement within the Assertion to be sent to the service provider.
If the above rule fails, then get the "CN" component of the "Subject" field in the authenticated user certificate and map it to the IDPEmail attribute in the Attribute Statement within the assertion to be sent to the service provider.
Get the "RFC822 Name" entry in the authenticated user certificate's "Subject Alternative Name" field and map it to the IDPEmail" attribute in the Attribute Statement within the Assertion to be sent to the service provider. In addition obtain the "Immutable ID" field for the user from the Active Directory and add it as the Subject of the Assertion to be sent to the service provider.

In some embodiments, an EMM solution can obtain user information required by all service providers at the time the user is provisioned to the system. Some of this information may be coded directly into the PKI certificates issued to the users, but some may be available to the identity provider later, when required. If new service providers that are added later require other information not previously with the EMM solution, the EMM solution can synchronize with the enterprise user information store to obtain the additional information and keep it avai⁺lable as and when required by users logging into the new service provider through the identity provider.

Figure 6:
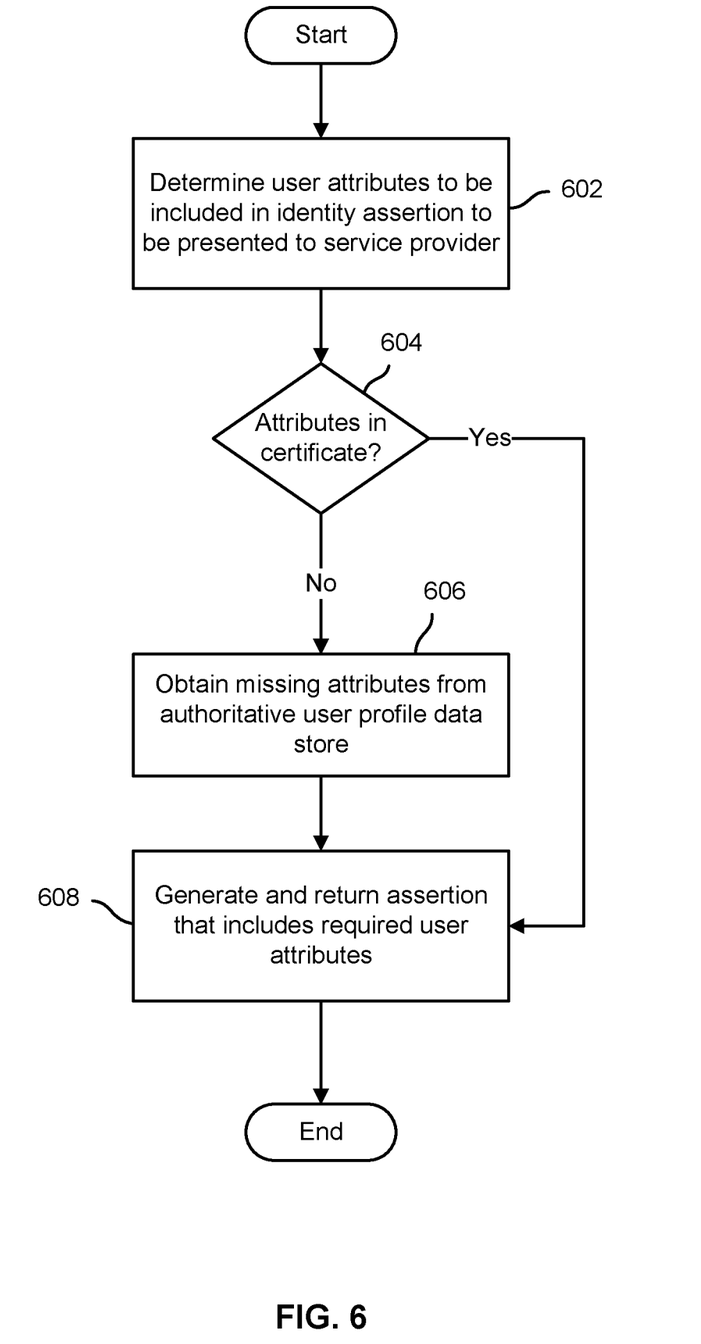
FIG. 6 is a flow chart illustrating an embodiment of a process to provide user attributes in connection with VPN-based authentication to a cloud service.

FIG. 6 is a flow chart illustrating an embodiment of a process to provide user attributes in connection with VPN-based authentication to a cloud service. In the example shown, the user attributes to be included in an assertion to be used to authenticate to a given cloud service are determined (602). If the attributes are (all) included in a certificate (604), an assertion to be used to authenticate to the cloud service is generated based on data from the certificate (608) and the process ends. If none or not all of the attributes needed to provide the assertion are included in the certificate (604), missing user attributes are obtained from an authoritative user profile data store (606), such as the enterprise's Active Directory® or other user directory, and an assertion based at least in part on data retrieved from the directory (606) is generated (608).

Figure 7:
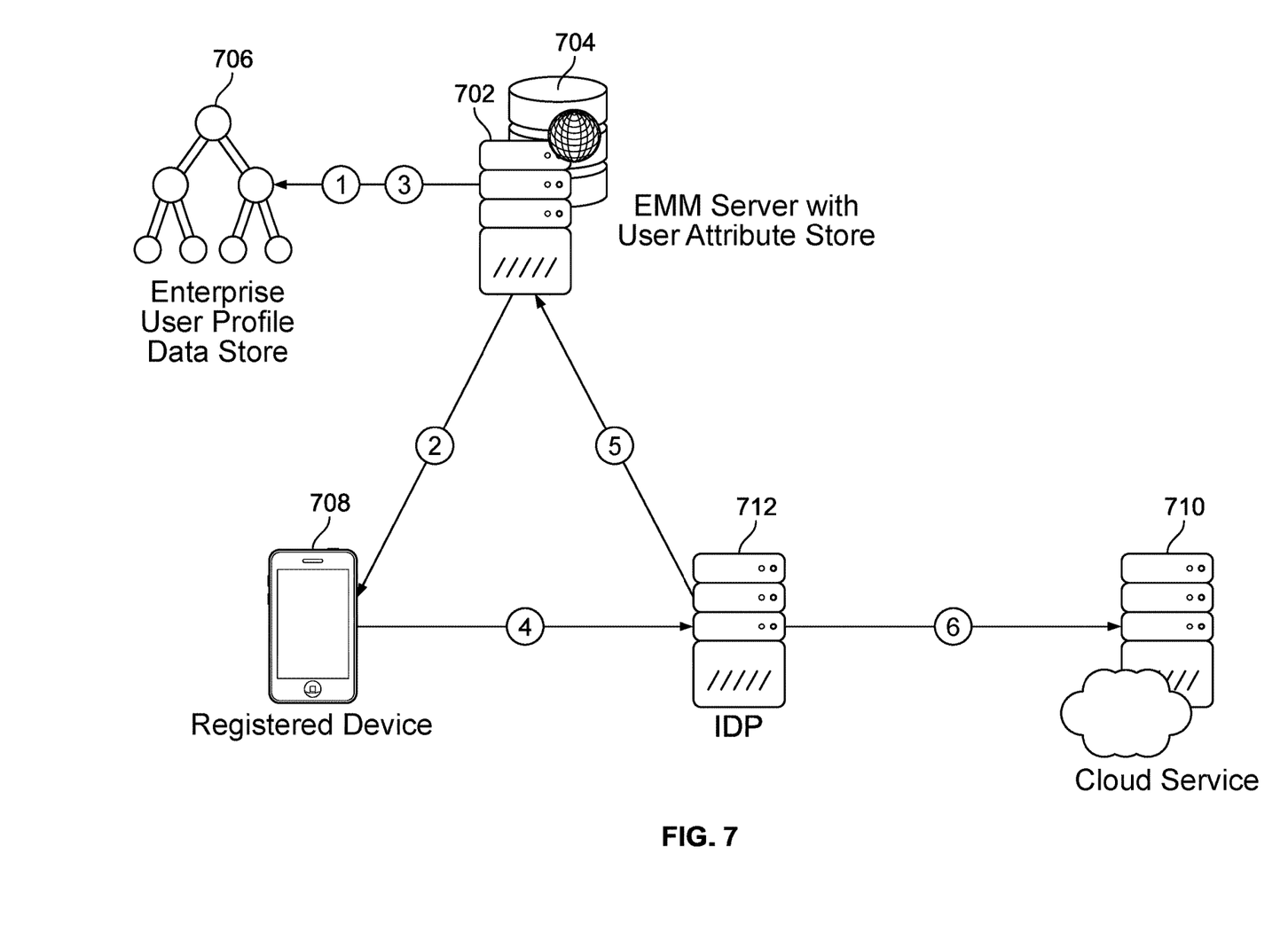
FIG. 7 is a block diagram illustrating an embodiment of a system and process to provide user attributes in connection with VPN-based authentication to a cloud service.

FIG. 7 is a block diagram illustrating an embodiment of a system and process to provide user attributes in connection with VPN-based authentication to a cloud service. In the example shown, processing may be performed as follows, with numbered paragraphs corresponding to numbered arrows in FIG. 7:
1. As users are provisioned, the EMM server 702 obtains user attributes required by all service providers from the enterprise user information store 706 and stores them in its attribute store 704.
2. The EMM 702 provisions certificates to managed devices 708 with all or at least uniquely identifying user information in them.
3. If new service providers are added to the identity provider 712, and those service providers require new user attribute information that is not already present in the EMM Attribute Store 704, then the EMM solution 702 obtains the additional attributes from the enterprise user information store 706 for all existing users. New users will automatically get all required attributes as in step 1.
4. When the user requests access via device 708 to a particular cloud service 710.
5. The identity provider 712 requests from the EMM attribute service 704 any additional attributes required by the cloud service provider 710.
6. The identity provider 712 then generates the identity assertion with all required information and sends it to the cloud service 710 (this may involve a redirect through the mobile device 708, not shown in FIG. 7).

Figure 8:
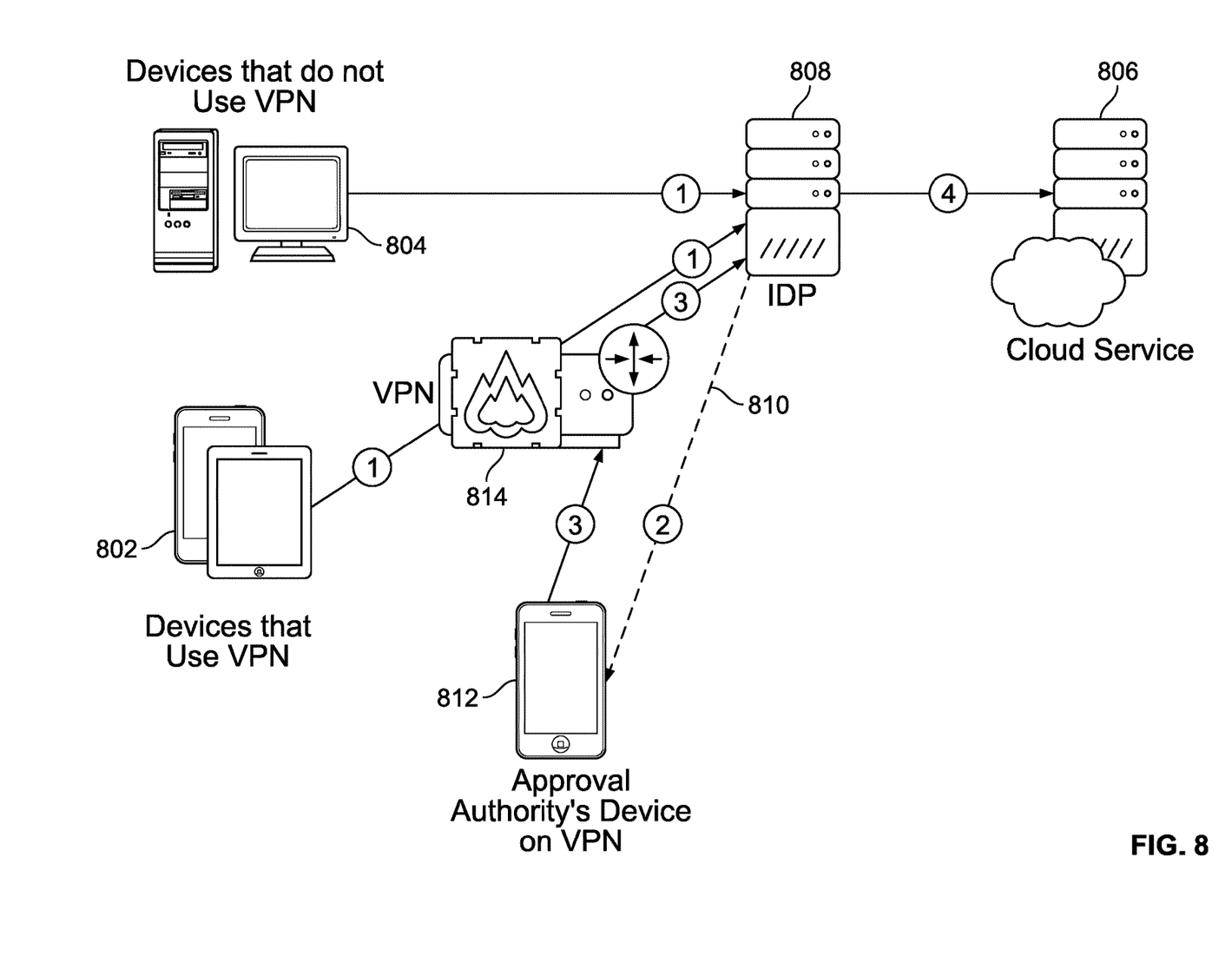
FIG. 8 is a block diagram illustrating an embodiment of a system and process to provide approval-based authentication to a cloud service.

FIG. 8 is a block diagram illustrating an embodiment of a system and process to provide approval-based authentication to a cloud service. In some embodiments, techniques disclosed herein may be used to provide secure approval-based access to cloud services. When a user requests access to a cloud service, an approver may be notified of the requested access. Upon authorization from the approver, the original request is allowed to progress.

In various embodiments, the approval process shown in FIG. 8 may be performed in addition to any push notification to be sent to the end-user for verifying the user's identity and context as described herein. In the example shown in FIG. 8 (numbered paragraphs corresponding to numbered arrows):
1. A user requests access to a cloud service through the identity provider 808, either from a device not connected to the VPN 804 or through a device connected over the VPN 802. This corresponds to the step "1" or "A" in FIG. 1.
2. Based on the user role and access policy, the identity provider 808 determines that another user (the Approver) is required to authorize this access. It generates a push notification 810 to the device 812 of the Approver, which is associated with VPN 814.
3. The Approver launches an agent on the Approver's device 812 as a result of the push notification, reviews the request and either authorizes or denies the request. Identity of the Approver may be verified via the association of device 812 with VPN 814.
4. If the Approver has authorized the request, the identity provider 808 generates an identity assertion with the identity of the requesting end-user and sends it (possibly via a browser redirect to the end-user's browser, which is not shown) to the cloud-service 806 to enable access.

In some embodiments, if the user's browser has timed out by the time the approver approves the request, the user can retry the request. In some embodiments, the identity provider may be configured to cache approvals for some period of time. If the identity provider finds a cached approval when it receives the end-user request, it does not go through the approval flow.

In various embodiments, an approval workflow such as the one illustrated in FIG. 8 may be used to provide secure registration and deployment of devices, including without limitation so called "Internet of Things" (IoT) and other network connected devices. In some embodiments, secure deployment of IoT devices, or other device registration, may be provided using approval techniques such as illustrated in FIG. 8. For example, in some embodiments, a user deploys an IoT device. The IoT device registers with its server, which is configured to authenticate it with the identity provider. The identity provider is configured with conditional rules to send a push notification to the user's mobile device agent application. The agent app scans the barcode or other data embodied in or otherwise associated with the IoT device and reports it back to the identity provider. The information in the barcode (or other source) is then included in the assertion back to the IoT server. This completes the secure registration.

In some embodiments, generic workflows may be supported, using techniques illustrated in FIG. 8 and described above, where an approval can trigger other approvals or a chain or quorum of approvals, or other workflows, each using techniques disclosed herein (e.g., a mobile app with certificates on a VPN-connected or otherwise managed device associated with the approving user) to confirm the entitlements of the approvers.

In some embodiments, approval as illustrated in FIG. 8 may be applied to establish identity and/or approval for a transaction—for example, a banking transaction may use techniques as disclosed herein to obtain approval from a user to a transfer of money.

In some embodiments, conditional rules may be defined and applied at runtime in connection with techniques disclosed herein. In some embodiments, an EMM server and/or identity provider may be configured to apply one or more rules to determine whether authentication techniques as disclosed herein may be applied based on factors such as the cloud-based application/service to which the user is attempting to authenticate; the time of day, day of the week, user location information, etc.; the role, privileges, departmental or other enterprise unit affiliation, etc. of the user; the device and/or user agent attempted to be used to access the cloud-based service; a security state, such as a global state, or a security posture of the user, a device associated with the user, etc.; etc.

While in various embodiments described herein a cloud-based service is being accessed, techniques disclosed herein may be used in various embodiments to access other services, such as a service provided via an on premises server. While SAML based authentication to a cloud-based service is described above, in various embodiments techniques disclosed herein may be used to authenticate to services that use other security protocols, such as OAuth or Kerberos. For example, in some embodiments, instead of an identity provider configured to provide SAML assertions based on VPN or non-VPN based techniques disclosed herein, an access node may use such techniques to determine whether to issue a Kerberos token to access the service.

While a mobile device is described in various examples as being used to verify identity (e.g., via VPN and/or non-VPN techniques) for purposes of authenticating a user attempting to access a service using another device, in various embodiments any device have Internet or other network access and processing capability may be used, including smart watches, other wearable technology, Internet of Things (IoT) devices such as automobiles, network-connected smart contact lens or other implants, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
a hardware processor coupled to the communication interface and configured to:
receive via the communication interface a request to authenticate a user to a service, wherein the request is received from a first device determined to be not connected through a virtual private network (VPN);
determine based at least in part on data comprising the request a user identity associated with the first device and a second device associated with the user identity, wherein the second device is registered to the VPN;
verify the first device including by:
instructing the second device to provide a context assurance input; and
receiving the context assurance input from an environment in which the second device is located; and
in response to verifying the first device, generate an identity assertion including by transforming the user identity to conform to a federated identity message expected by the service; and
provide the identity assertion via the communication interface to a requesting node with which the request to authenticate is associated;
wherein the second device comprises an enterprise-managed mobile device and the hardware processor is further configured to receive security posture information associated with a mobile device and to generate the identity assertion based at least in part on a determination that the security posture information associated with the mobile device indicates the mobile device is in a secure state.

2. The system of claim 1, wherein the request to authenticate is associated with a redirection by the service to an identity provider associated with said system.

3. The system of claim 1, wherein the user identity is determined based at least in part on a credential associated the VPN.

4. The system of claim 1, wherein the processor is further configured to send a notification to the second device, and wherein an agent on the second device is configured to respond to the notification at least in part by prompting a user of the second device to provide an input.

5. The system of claim 4, wherein the input comprises a credential.

6. The system of claim 4, wherein the input comprises the context assurance input that includes receiving from an environment in which the first device is located a context assurance data and the second device is configured to send data associated with the context assurance data to the processor.

7. The system of claim 6, wherein the context assurance input comprises one or more of a visual challenge that is displayed on a display of the first device and scanned using the second device; a Bluetooth or other near field emission of or communication from the first device to the second device; or other data displayed or otherwise provided as output by the first device and received by the second device via a direct path within a physical space within which both the first device and the second device are collocated.

8. The system of claim 1, wherein the second device is associated with a second user having an approval authority with respect to the request, and wherein the processor is configured to generate the identity assertion based at least in part on an approval response received via the second device.

9. The system of claim 3, wherein the credential comprises a certificate.

10. The system of claim 9, wherein the certificate includes a user attribute data associated with the service.

11. The system of claim 10, wherein generating the identity assertion includes reading said user attribute data from the certificate and using at least a portion of said user attribute data read from the certificate to populate a data value of the identity assertion.

12. The system of claim 11, wherein the processor is further configured to obtain from an enterprise user directory additional user attributes to be included in the identity assertion.

13. A method, comprising:
receiving a request to authenticate a user to a service, wherein the request is received from a first device determined to be not connected through a virtual private network (VPN);
determining based at least in part on data comprising the request a user identity associated with the first device and a second device associated with the user identity, wherein the second device is registered to the VPN;
verifying the first device including by:
instructing the second device to provide a context assurance input; and
receiving the context assurance input from an environment in which the second device is located; and
in response to verifying the first device, generating an identity assertion including by transforming the user identity to conform to a federated identity message expected by the service; and
providing the identity assertion to a requesting node with which the request to authenticate is associated;
wherein the second device comprises an enterprise-managed mobile device and the hardware processor is further configured to receive security posture information associated with a mobile device and to generate the identity assertion based at least in part on a determination that the security posture information associated with the mobile device indicates the mobile device is in a secure state.

14. The method of claim 13, wherein the user identity is determined based at least in part on a credential associated with the VPN.

15. A computer program product embodied in a non-transitory computer readable medium and comprising computer instructions for:
receiving a request to authenticate a user to a service, wherein the request is received from a first device determined to be not connected through a virtual private network (VPN);
determining based at least in part on data comprising the request a user identity associated the first device and a second device associated with the user identity, wherein the second device is registered to the VPN;
verifying the first device including by:
instructing the second device to provide a context assurance input; and receiving the context assurance input from an environment in which the second device is located; and in response to verifying the first device, generating an identity assertion including by transforming the user identity to conform to a federated identity message expected by the service; and providing the identity assertion to a requesting node with which the request to authenticate is associated;

wherein the second device comprises an enterprise-managed mobile device and the hardware processor is further configured to receive security posture information associated with a mobile device and to generate the identity assertion based at least in part on a determination that the security posture information associated with the mobile device indicates the mobile device is in a secure state.

16. The computer program product of claim 15, wherein the user identity is determined based at least in part on a credential associated with the VPN.

* * * * *